No. 787,009. PATENTED APR. 11, 1905.
L. M. THOMSON.
GRAIN WEIGHING DEVICE FOR THRESHING MACHINES.
APPLICATION FILED JUNE 18, 1903.
2 SHEETS—SHEET 1.
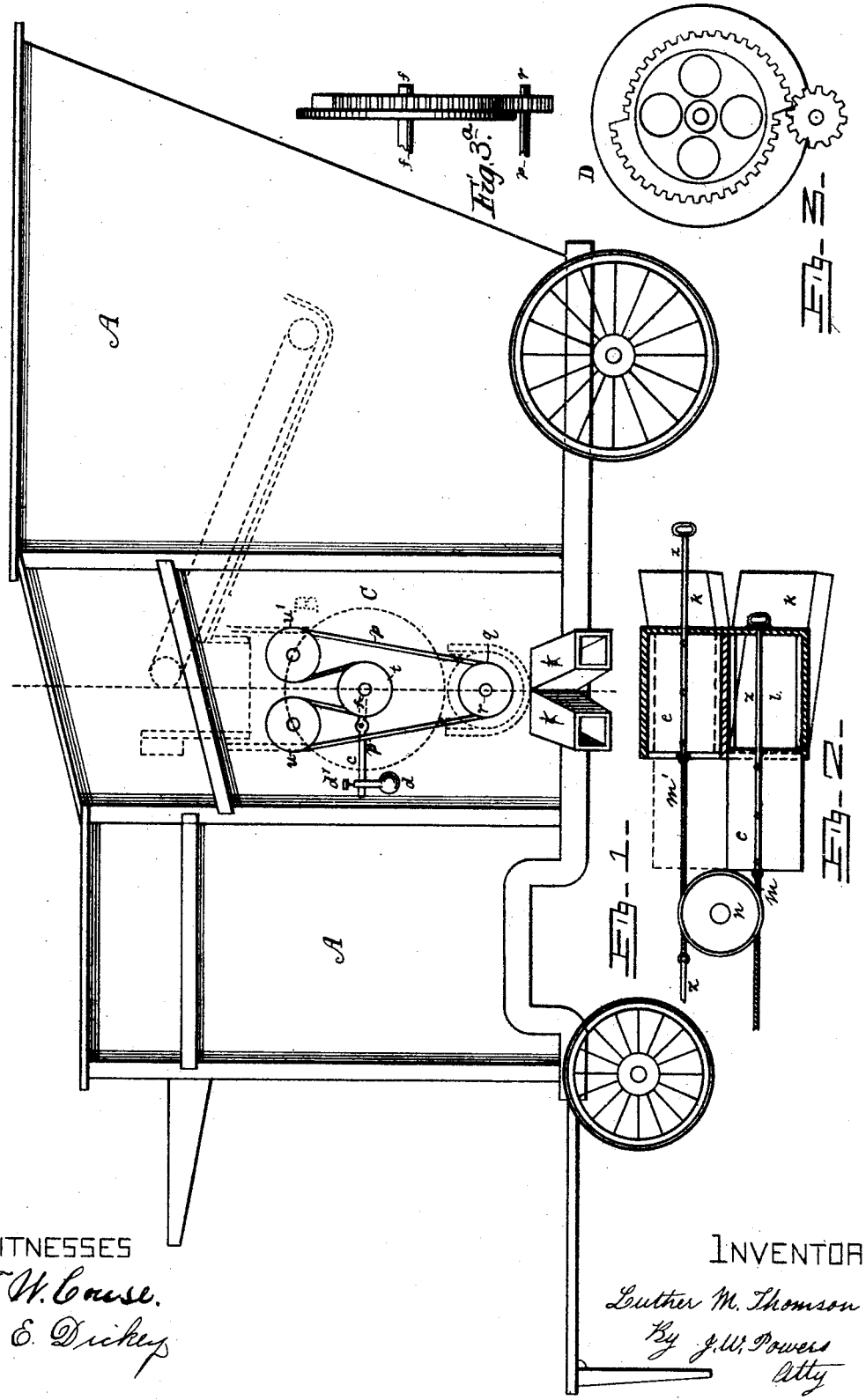
WITNESSES
F. W. Couse.
E. E. Dickey
INVENTOR
Luther M. Thomson
By J. W. Powers
Atty No. 787,009. PATENTED APR. 11, 1905.
L. M. THOMSON.
GRAIN WEIGHING DEVICE FOR THRESHING MACHINES.
APPLICATION FILED JUNE 18, 1903.
2 SHEETS—SHEET 2.
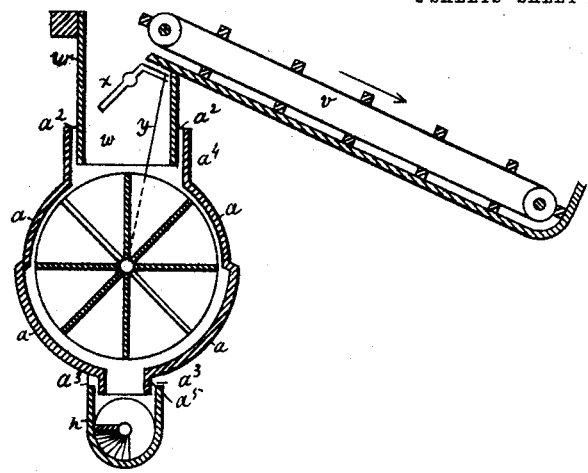
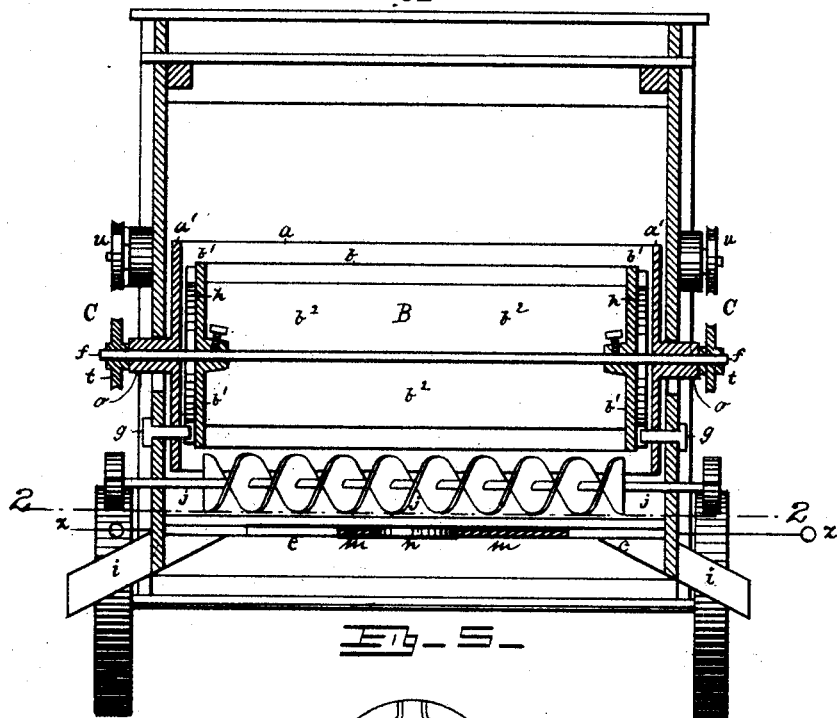
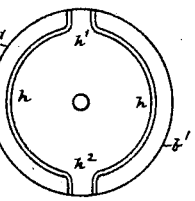
WITNESSES
INVENTOR
Leuther M. Thomson
By J. W. Powers
Atty No. 787,009. Patented April 11, 1905.

UNITED STATES PATENT OFFICE.

LUTHER M. THOMSON, OF ST. LOUIS PARK, MINNESOTA.

GRAIN-WEIGHING DEVICE FOR THRESHING-MACHINES.

SPECIFICATION forming part of Letters Patent No. 787,009, dated April 11, 1905.

Application filed June 18, 1903. Serial No. 162,095.

*To all whom it may concern:*

Be it known that I, LUTHER M. THOMSON, of St. Louis Park, in the county of Hennepin and State of Minnesota, have invented new and useful Improvements in Grain-Weighing Devices for Threshing-Machines, of which the following is a specification, reference being had to the accompanying drawings.

My invention relates to devices for separating the grains from straw, commonly called "grain-separators" or "threshing-machines;" and it consists of an improved weighing and measuring device therefor.

In the drawings referred to, Figure 1 is a side elevation of a threshing-machine equipped with one of my weighing and measuring devices; Fig. 2, a horizontal section of a section of Fig. 5, taken on the line 2 2; Fig. 3, a side elevation, and Fig. $3^a$ an end view, of a double cam gear-wheel and pinion adapted to be used to operate my weighing and measuring device; Fig. 4, a vertical section of a portion of Fig. 1 and a cross-section of my weighing and measuring cylinder; Fig. 5, a vertical cross-section of Fig. 1, taken on the line 5 5; and Fig. 6, an end view of my weighing and measuring cylinder removed from the threshing-machine case.

Similar letters refer to similar parts.

A is the threshing-machine, B my weighing and measuring cylinder, and C the operating mechanism.

The threshing-machine A does not differ materially from those commonly used, and therefore needs no detailed description herein.

The weighing and measuring device B consists of the case $a$, the cylinder $b$, the scale-beam $c$, the poise $d$, and the sliding covers $e$. The case $a$ is centrally located within the threshing-machine A, as shown by the dotted lines in Fig. 1 and by the solid lines in Fig. 5. It lies transversely to and extends substantially from one of the vertical side walls of the threshing-machine A to the other, is suspended upon and vertically movable with the horizontal shaft $f$. It is provided with heads or end pieces $a'$, which heads are centrally pierced to receive a horizontal shaft $f$, hereinafter described, and is provided upon its upper side with an opening $a^2$ and upon its under side with a similar opening $a^3$, the purposes of which will be set forth in their order. These openings $a^2$ and $a^3$ are guarded by the vertical walls $a^4$ and $a^5$, the former being adapted to telescope by closing over and outside the lower portion of the threshing-machine hopper $u$ and the latter being adapted to telescope by closing inside the upper portion of the conveyer-trough $h$ of the threshing-machine A. The cylinder $b$ consists of the cylindrical heads $b'$, rigidly affixed to the before-mentioned horizontal shaft $f$ and the radial walls $b^2$, connecting the heads $b'$, the whole constituting a revoluble cylindrical group of troughs, each of which is adapted to hold a predetermined quantity of grain—say, for instance, one peck. It is located within the case $a$ and revoluble from the shaft $f$. Upon the outer faces of the heads $b'$ of the cylinder B are guards $h$, and affixed in the side walls of the said threshing-machine body are pins $i$, adapted to engage with and to lock the said guards $h$ and to thereby prevent the rotations of the cylinder $b$. The general form of the guards $h$ is that of rings having openings $h'$ upon their upper sides and diametrically opposite thereto similar openings $h^2$, which openings are adapted to receive (as the shaft $f$ drops down) the pins or lugs $i$.

The scale-beam $c$ is pivotally affixed upon the vertical side wall of the threshing-machine A, (preferably on a level with the shaft $f$.) One end of this beam $c$ is loosely mounted upon the shaft $f$, and its opposite free end is graduated to indicate pounds and fractions thereof. The poise $d$ is mounted and longitudinally movable upon the scale-beam $c$, its purpose being to counterbalance (weight) the grain in the cylinder $b$. It is provided with a set-bolt $d'$ or its equivalent, by means of which it may be temporarily affixed in place upon the said scale-beam $c$.

The sliding covers $e$ lie horizontally between the conveyer-trough $j$ and the discharge-spouts $k$ of the threshing-machine A and serve to alternately open and close the ports $l$, leading from the former to the latter, as will hereinafter be set forth. These sliding covers $e$ are arranged in two pairs (one pair on each side of the threshing-machine A) and are operated independently, the covers of each pair being connected by means of short cables $m$ and $m'$, which cables extend to and wind round a grooved wheel $n$, which grooved wheel lies midway between the two pairs of covers. This wheel is journaled upon a vertical pin and oscillates in a horizontal plane.

The horizontal shaft $f$ extends longitudinally through the case $a$ and rotates the cylinder $b$ incased thereby. Its ends are journaled and revoluble within suitable boxes $o$, which boxes are in turn chambered and vertically movable in the vertical side walls of the threshing-machine A.

The system of pulleys C which serve to operate my weighing and measuring device consists of four pulleys, arranged substantially as shown in Fig. 1, and of a driving-belt $p$ thereon. The driving-pulley $q$ is affixed to and is rotated by the shaft $r$ of the threshing-machine conveyer $s$. The driven pulley $t$ is affixed to the horizontal shaft $f$ of my weighing and measuring device B, and the idler-pulleys $u$ and $u'$ are pivoted or otherwise revolubly affixed to the vertical side wall of the threshing-machine A. The endless belt $p$ extends under and around the driving-pulley $q$, thence upward over and around the idlers $u$ and $u'$, and thence downward and around the driven pulleys.

The double cam-gear and pinion D (shown in Fig. 3) would serve the same purpose as the system of pulleys C and might be substituted therefor; but I prefer to use the pulleys and belt shown.

The operation of my weighing and measuring device is as follows: The grain when threshed falls into a trough of the threshing-machine, (not shown,) which trough lies under the cylinder thereof. This grain is carried up by means of cleated belts $v$ (shown by dotted lines in Fig. 1) and emptied into the hopper $w$, (also shown by dotted lines in Fig. 1,) from which in turn it passes into my weighing and measuring cylinder $b$. When a predetermined quantity of grain has thus entered a compartment of the cylinder $b$, its weight will overbalance the poise $d$ and depress the case $a$, (the boxes $o$ sliding downward in the vertical walls of the threshing-machine,) thereby tightening the driving-belt upon the driven pulley $t$, when the cylinder $b$ will be rotated and the weighed or measured grain will be dumped into the conveyer-trough $j$. When the cylinder is thus lightened of its load, (through the operation of the poise or counterbalance $d$,) it will again be raised through the operation of the poise, thus removing the tension from the driving-belt $p$, when another compartment may in a like manner be filled, rotated, and emptied. To prevent the grain from entering the second compartment while the first one is being rotated and emptied, I interpose the gate $x$ between the upper (discharge) end of the cleated belts $v$ and the chambered cylinder $b$. This gate is automatically operated by means of the connecting-rod $y$, which rod extends to and is connected with the horizontal shaft $f$. It will therefore be seen that when the poise $d$ is overbalanced by the grain in the cylinder $b$ and the shaft $f$ is depressed, that thereby the gate $x$ will be closed, thus shutting off the grain at $x$, and that when the overbalancing grain is discharged from the cylinder $b$, that through the upward movement of the shaft $f$ the said gate will again be opened. To prevent the cylinder $b$ from rotating within the case $a$ before the latter is depressed, I affix the horizontally-extending pins or lugs $i$ in the walls $a'$ of the case A, which pins enter the opening $h'$ or $h^2$ of the guards $h$, and thereby lock the cylinder $b$ in its then present elevated position, which cannot, therefore, be rotated until it is again depressed, thereby releasing the said pin $i$ from the openings $h'$ or $h^2$ of the guards $h$.

The sliding covers $e$ are operated alternately by hand through the use of the draw-bars Z connected thereto.

It is of course understood that but two of the spouts and but two of the covers are to be operated at one and the same time, as the cylinder $b$ is adapted to rotate in either direction, and that when one pair of covers are in use the other pair may be released from duty by removing their cable $m$ from the grooved wheel $n$.

What I claim as new, and desire to secure by Letters Patent, is—

1. In a threshing-machine having a grain-elevating device, a hopper into which the elevated grain is discharged, and a grain-conveyer for carrying the grain away from the machine—all lying within the case of the said threshing-machine, of a grain weighing and measuring device embodying a vertically-movable case, a longitudinally-chambered cylinder incased by and revoluble within the said case, a horizontal shaft journaled in the heads of the said case and adapted to revolve the said cylinder therein, a scale-beam and poise for counterbalancing the said case and cylinder, and for weighing the grain therein, and means for intermittently imparting semirotations to the said cylinder, substantially as shown and for the purpose specified.

2. In a threshing-machine having parallel vertical side walls, the combination of a horizontal shaft journaled in boxes vertically movable in the said side walls, a longitudinally-chambered cylinder affixed to and revoluble with the said shaft; a case inclosing the said chambered cylinder and vertically movable with the said horizontal shaft, and means of imparting semirotations to the said chambered cylinder, substantially as shown and for the purpose specified.

LUTHER M. THOMSON.

Witnesses:
FRANK E. O'BRIEN,
S. M. DICKEY.